(12) United States Patent
Cavalca et al.

(10) Patent No.: US 12,242,075 B2
(45) Date of Patent: Mar. 4, 2025

(54) READING DEVICE FOR AN APPARATUS WITH GLASS OR SCREEN

(71) Applicant: FGP CAPITAL SA, Geneva (CH)

(72) Inventors: Fabrizio Cavalca, Carouge (CH); Rene Grand, Genthod (CH); Philippe Froehlicher, Geneva (CH)

(73) Assignee: FGP CAPITAL SA (CH)

( * ) Notice: Subject to any disclaimer, the term of this patent is extended or adjusted under 35 U.S.C. 154(b) by 1329 days.

(21) Appl. No.: 16/497,450

(22) PCT Filed: Mar. 27, 2018

(86) PCT No.: PCT/IB2018/052071
§ 371 (c)(1),
(2) Date: Sep. 25, 2019

(87) PCT Pub. No.: WO2018/178858
PCT Pub. Date: Oct. 4, 2018

(65) Prior Publication Data
US 2020/0387001 A1    Dec. 10, 2020

(30) Foreign Application Priority Data
Mar. 27, 2017    (CH) .................................... 00400/17

(51) Int. Cl.
*G02B 27/02*    (2006.01)
*G04B 39/00*    (2006.01)
*H04M 1/02*    (2006.01)

(52) U.S. Cl.
CPC ......... *G02B 27/027* (2013.01); *G04B 39/006* (2013.01); *G04B 39/008* (2013.01); *H04M 1/0266* (2013.01)

(58) Field of Classification Search
CPC .. G02B 27/027; G02B 25/007; G04B 39/006; G04B 39/008; H04M 1/0266
See application file for complete search history.

(56) References Cited

U.S. PATENT DOCUMENTS 5,883,860 A * 3/1999 McKay ............... G02B 25/002
359/809
2003/0071780 A1 * 4/2003 Vincent ................. B82Y 20/00
345/107

(Continued)

FOREIGN PATENT DOCUMENTS

CN    204894644 U  * 12/2015
CN    205179147       4/2016

(Continued)

OTHER PUBLICATIONS

Translation of CN-204894644 (Year: 2015).*
Machine Translation of JP2008083423A (Year: 2008).*
Machine Translation of TW M551125U (Year: 2017).*

*Primary Examiner* — Cara E Rakowski

(57) ABSTRACT

A crystal/glass or screen of an apparatus intended to display an information visible to a user includes on its outer surface a transparent protective film with a convex outer surface, constituting a lens in order to facilitate reading. The transparent protective film constituting a lens is a layer (2) of transparent sapphire glass material having an anti-scratch surface. This layer (2) includes a convex outer surface forming a lens and an inner surface carrying a transparent repositionable glue film (4) by which said layer (2) can be removably glued to the outer surface of the crystal or of the screen (1).

12 Claims, 2 Drawing Sheets

(56) References Cited

U.S. PATENT DOCUMENTS

| | | | |
|---|---|---|---|
| 2006/0171044 A1* | 8/2006 | Carnevali | G02B 25/005 |
| | | | 359/802 |
| 2012/0243110 A1 | 9/2012 | Robinson | |
| 2015/0362736 A1* | 12/2015 | Kowasic | G02B 27/027 |
| | | | 359/478 |
| 2018/0095428 A1* | 4/2018 | Godoy | G04B 43/002 |
| 2018/0196559 A1* | 7/2018 | Lin | G06F 1/1626 |
| 2019/0094520 A1* | 3/2019 | Kelly | G02F 1/133526 |

FOREIGN PATENT DOCUMENTS

| | | | |
|---|---|---|---|
| JP | H05333164 | | 12/1993 |
| JP | 2000174866 | | 6/2000 |
| JP | 2008083423 A | * | 4/2008 |
| JP | 2015072146 | | 4/2015 |
| TW | M551125 U | * | 11/2017 |
| WO | WO 03/009049 | | 1/2003 |

\* cited by examiner

READING DEVICE FOR AN APPARATUS WITH GLASS OR SCREEN

BACKGROUND OF THE INVENTION

Field of Invention

The present invention relates to a reading device for magnifying a display, in particular for apparatuses including a crystal (or glass) or a screen while guaranteeing an anti-scratch protection of the apparatus and secondarily a sealing of the apparatus.

Description of Related Art

Thus, there is for example known DE202015004726 which describes a self-adhesive film for a smartphone or a tablet with different diopter forces. This document gives no technical teaching and only describes an idea.

There is known from the state of the art watch glasses equipped with a magnifier for magnifying a date display, in particular by machining the magnifier in the watch glass. The advantage of such magnifier is that it allows an easier reading of the information but the disadvantage is that it harms the aesthetics of the watch.

CH368756 describes a calendar timepiece, whose dial has a window in which the date indications appear and which is surmounted by a magnifier which is comprised by the crystal. The magnifier is surrounded by a frame that is secured to the crystal and housed or embedded therein.

EP0693718 describes a watch comprising a casing, first display means, a first mirror and magnifying optical means arranged so as to optically magnify the display means.

EP3062172 describes a watch comprising a casing provided with a watch glass and a timepiece movement housed in this casing. The watch glass supports a magnifying optical device provided to visually magnify at least momentarily an element of the timepiece movement visible through this watch glass. The implementation of this embodiment remains complex.

GB 2402229 describes an apparatus intended to display an information, including a lens arranged to facilitate the reading and removably attached by a glue or a suction cup. A disadvantage of this embodiment is that the setting up of the lens is made approximatively which, within about a few tens of millimeters, can distort the reading and have an opposite effect to what a user would seek, that is to say to help with reading.

The purpose of the present invention is to propose a removable reading device for magnifying a display for apparatuses including a crystal (or glass) or a screen whose exchange is precise and easy while providing an anti-scratch protection of the crystal or the screen and secondarily preserving the sealing of the apparatus.

BRIEF SUMMARY OF THE INVENTION

In accordance with the invention, a crystal (or glass) or a screen of an apparatus for displaying an information visible to a user, includes on its outer surface a transparent protective film including an outer surface with a convex area constituting a lens in order to facilitate reading. The transparent protective film constituting a lens is a layer of material including the convex outer surface and an inner surface carrying a transparent repositionable glue film by which said layer is removably glued to the outer surface of the crystal or the screen.

A first layer of material constituting the surface of the crystal or screen is formed of a polycarbonate with a thickness comprised between 0.2 mm and 2 mm, typically 0.8 to 1.2 mm.

Said layer with a convex outer surface is a second layer formed of a transparent sapphire glass having an anti-scratch surface and is superimposed on the first layer thanks to positioning means, in which the second sapphire glass layer has a maximum thickness, excluding the convex area, comprised between 0.2 and 2 mm, for example 0.4 mm and 1.2 mm, typically 0.5 and 0.6 mm.

The positioning means for facilitating the positioning of the second layer of material on the first layer of material include a protuberance or a groove, arranged on the outer or inner periphery of the first material so that these positioning means surround all or part of the second layer of material that covers the first layer of material.

Thus, the transparent repositionable glue film is deposited on the inner face of the second layer of transparent glass material, so that the second layer of material with the repositionable glue can be removed without breaking the sealing of said apparatus.

Moreover, in addition to this need for magnifying an information visible on a screen or through a crystal, the present invention allows protecting the aesthetics of the screen or of the crystal while secondarily maintaining a sealing of the apparatus. Indeed, the degradation of the visual aspect of an apparatus including a crystal or a screen, for example a watch, when worn is a quality perception factor essential for the consumer. In addition, the sealing of the apparatuses including crystals or screens is important for the proper operation of said apparatuses.

The first layer of material, the second layer of material and the repositionable glue film, once stacked, typically have a thickness comprised between 0.8 mm and 5 mm, for example 2 mm.

In one embodiment, the positioning means include a notch formed in the first layer of material, for example this notch constitutes an outer peripheral protuberance of the first layer of material.

In these embodiments, the first layer of material and/or the second layer of material advantageously have an antireflection treatment to optical radiation in the visible wavelength range.

In one embodiment, the system includes sealing means including a protuberance, a joint or a gluing arranged on the outer periphery of the first material.

In one embodiment, the sealing of the apparatus can be ensured by an O-ring joint which would be positioned between the apparatus and the first layer of material or by ultrasonic gluing which would be performed on the first layer of material.

In one embodiment, the lens is a converging lens including a vergence comprised between 0.25 and 4 diopters, typically 2. According to the present invention, it is therefore possible to use different lenses made of transparent glass, in particular of reconstituted sapphire, with a convergence allowing an adaptation of the diopter depending on the reading ability of the user. Indeed, some users will feel more comfortable than others depending on the artificial magnification of the image under the crystal by a more or less pronounced diopter. An advantage of this possibility of removing a lens having a given diopter from the apparatus is that depending on the vision of two users, each of them can use the same apparatus by adapting the appropriate lens to his eyesight.

To this end, users will be able to acquire sets of lenses whose diopter of each lens is the same or which varies from one lens to another.

The invention is applied in particular to wristwatches, smartphones, tablets, interactive terminals, game consoles, touch tables and bancomats.

The transparent repositionable glue is selected in a suitable manner by adjusting its mechanical properties and in order to be compatible with the support on which it is coated on the one hand, and the support on which it is glued in a repositionable manner. Preferably, the repositionable glue is deposited at the end of the manufacture of the transparent glass crystal, for example by spraying homogeneously over the entire glass surface. Advantageously, the glue is selected among the glues allowing a quasi-instantaneous intake on the surface on the glass crystal. For example, the glue may have been coated, after a drying time, with a PTFE (polytetrafluoroethylene) film which the user detaches before gluing of the sapphire crystal onto the first layer of material.

In a variant, the glue applied onto the inner surface of the layer of the sapphire glass material is in the form of double-faced adhesive tape with a polyester support and a high-performance surface adhesive that provides good adhesion on the substrates with high and low surface energy. The thickness of the repositionable glue is comprised between 80 microns and 250 microns depending on the selected model. The double-faced tape is of course transparent. Moreover, the glue has a very good resistance to shearing and peeling. Preferably the glue has an adhesion force comprised between 5 N/cm and 50 N/cm, typically 15 N/cm on the inner side of the layer of sapphire glass material.

Such a mobile device allowing to combine the sealing aspect and the scratch-resistant aspect may be for example not only a wristwatch, a smartphone, a tablet or even any other similar portable apparatus including a screen such as a portable game console but also a fixed apparatus, in particular an interactive terminal, a parking meter or an automatic teller machine such as a bancomat.

According to another aspect of the invention, a lens includes a layer of transparent sapphire glass, having an anti-scratch surface on a first face, a second opposite face carrying a transparent repositionable glue film by which the lens can be removably glued on the outer surface of the crystal or the screen, with a precise and easy positioning thanks to the positioning means on a first complementary layer.

Preferably, the lens includes a diopter comprised between 0.5 diopter and 4 diopters, typically 2.

In one embodiment, a set of lenses includes lenses whose diopter of each lens of the set has a value comprised between 0.5 and 4 diopters. For example, a set of lenses may include lenses whose diopter of each lens is the same or which varies from a lens of the set always for a value comprised between 0.5 and 4 diopters.

BRIEF DESCRIPTION OF THE DRAWINGS

The characteristics of the invention will appear more clearly upon reading the description of several embodiments given only by way of example, in no way restrictive, with reference to the schematic figures, in which.

DETAILED DESCRIPTION OF THE INVENTION

Figure 1:
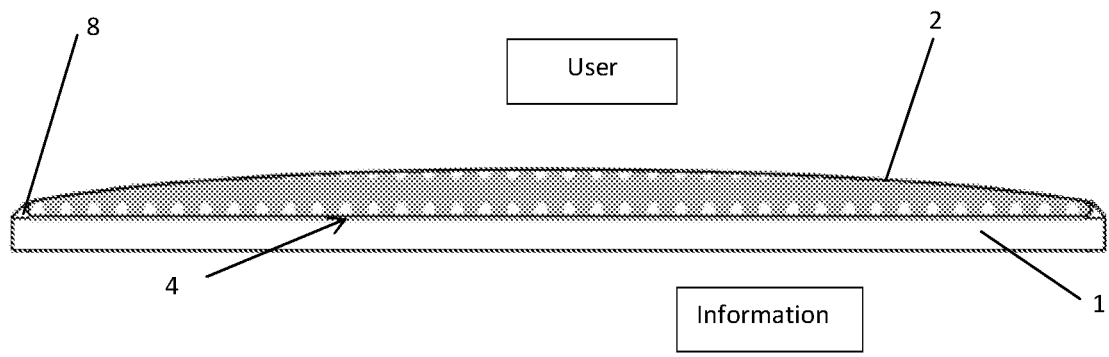
FIG. 1 shows a sectional view of a stack of layers of materials according to the present invention.

In the embodiment illustrated in FIG. 1, the crystal/glass of an apparatus intended to display an information visible to a user includes on its outer surface a transparent protective film with a convex outer surface, constituting a lens having a value for example of two diopters in order to facilitate the reading. The transparent protective film constituting a lens is a layer 2 of reconstituted transparent sapphire glass material, having an anti-scratch surface. This layer 2 includes a convex outer surface and an inner surface carrying a transparent repositionable glue film 4 by which the layer 2 is removably glued to the outer surface of a layer 1 of unbreakable transparent plastic polymer material, here a polycarbonate, arranged to be mounted on an apparatus so that a first face is arranged on the information side and a second face on the user side. The second layer 2 of transparent sapphire glass material is superimposed on the first layer 1 thanks to positioning means 8 in the form of a peripheral protuberance. The second sapphire glass layer 2 constitutes the transparent film constituting the lens. The repositionable glue film 4 is arranged on the inner face of the layer 2 of transparent sapphire glass so that the layer 2 of sapphire glass with the repositionable glue 4 can be removed without breaking the sealing of said apparatus.

In the example of FIG. 1, the convex area of the layer 2 extends to the periphery thereof. In non-illustrated variants, the layer 2 has a convex central area surrounded by a flat peripheral area having a constant thickness.

Figure 2:
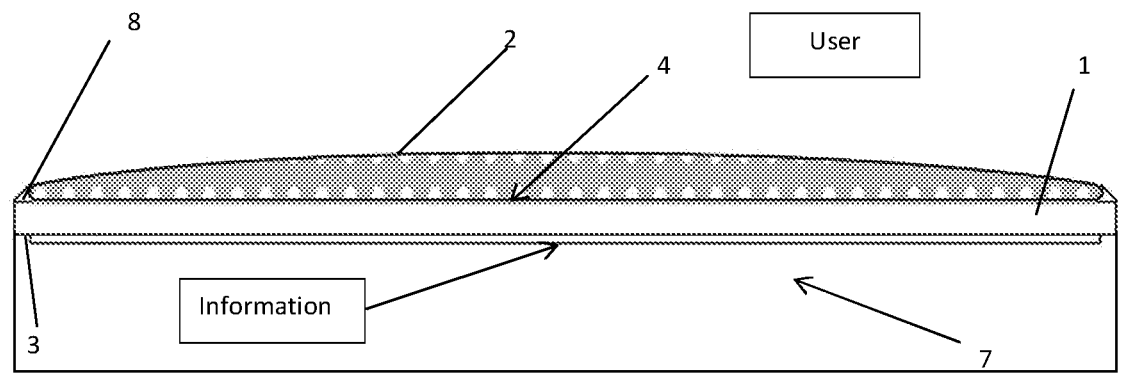
FIG. 2 shows a sectional view of a system mounted on an apparatus including a screen.

As illustrated in FIG. 2, the screen of the present invention is arranged so as to be incorporated into an apparatus 7 without denaturing it. The apparatus 7 comprises sealing means 3 in the form of a welding of the peripheral end of the first polycarbonate layer 1 on the outer periphery of the apparatus 7. Positioning means 8 surround the sapphire glass lens having a value of about two diopters which covers the first layer 1 of polycarbonate. A transparent repositionable glue film 4 is deposited on the inner face of the second transparent sapphire glass layer 2, so that the second layer 2 of material with the repositionable glue 4 can be removed without breaking the sealing of said apparatus 7 while adapting the sapphire glass lens to the eyesight of the user.

Figure 3:
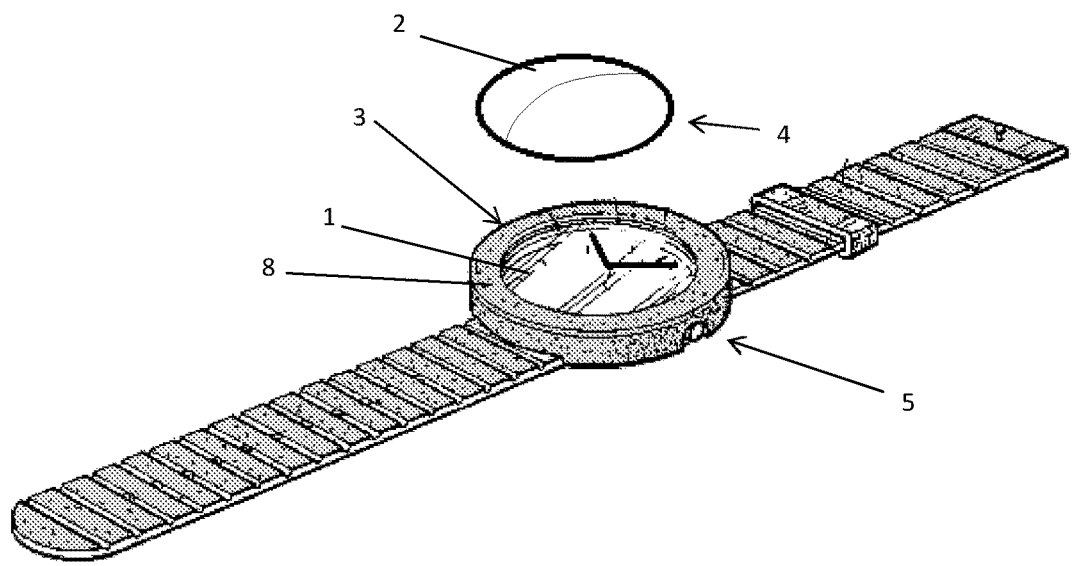
FIG. 3 shows a side view of a wristwatch in which a removable crystal including a repositionable glue is disposed to be arranged on a crystal of the watch.

In the example illustrated in FIG. 3, a wristwatch 5 includes a watch crystal according to the present invention. The removable watch crystal made of transparent sapphire glass in the form of a magnifier allows not only enlarging the display present on the watch dial, but also, at each change of lens, the sealing of the wristwatch is preserved. Thus, the sapphire glass lens provides an enlargement of the information and an anti-scratch protection of the wristwatch 5 intended to display the time through the crystal. In this example, the first layer 1 of material is made of an unbreakable transparent polycarbonate. The polycarbonate layer 1 is arranged on the wristwatch 5 so that a first face is arranged on the dial side of the wristwatch 5 and a second face on the user side. Polycarbonate is a material widely used in the timepiece field, in particular for its robustness, despite its sensitivity to scratches. A second transparent sapphire glass layer 2 having an anti-scratch surface is ready to be arranged on the polycarbonate layer 1 mounted on the wristwatch 5.

The sapphire glass lens has a value for example of two diopters. The transparent sapphire glass lens carries a repositionable glue film 4 arranged on the inner face of the transparent sapphire glass lens. Thus, the layer 2 of sapphire glass with the repositionable glue 4 can be superimposed on the first polycarbonate layer 1 arranged on the wristwatch 5 and if necessary, for example in case of breakage of the sapphire glass layer 2, or in case of adaptation of the sapphire lens to the eyesight of another user, the sapphire glass layer 2 can be removed without breaking the sealing of the wristwatch 5. A watch bezel provides a means for positioning 8 the sapphire crystal, the watch bezel being arranged on the outer periphery of the polycarbonate 1 so that these sealing means 3 surround the polycarbonate layer 1 and will never be broken in case of change of the sapphire crystal.

In a non-illustrated variant, the sapphire glass is contained in a notch of the crystal, which housing is hollowed either in the bezel of the casing, or directly in its middle.

In this example, the stack of the layers of polycarbonates, sapphire glass and of the repositionable glue represent a thickness of 2.6 mm. The polycarbonate has a thickness of 1 mm and the sapphire glass a thickness of 0.55 mm.

Regarding smartphones, the screen is by far the most frequently broken element even if it is a reinforced glass. Sapphire is more robust and more scratch-resistant than glass.

Figure 4:
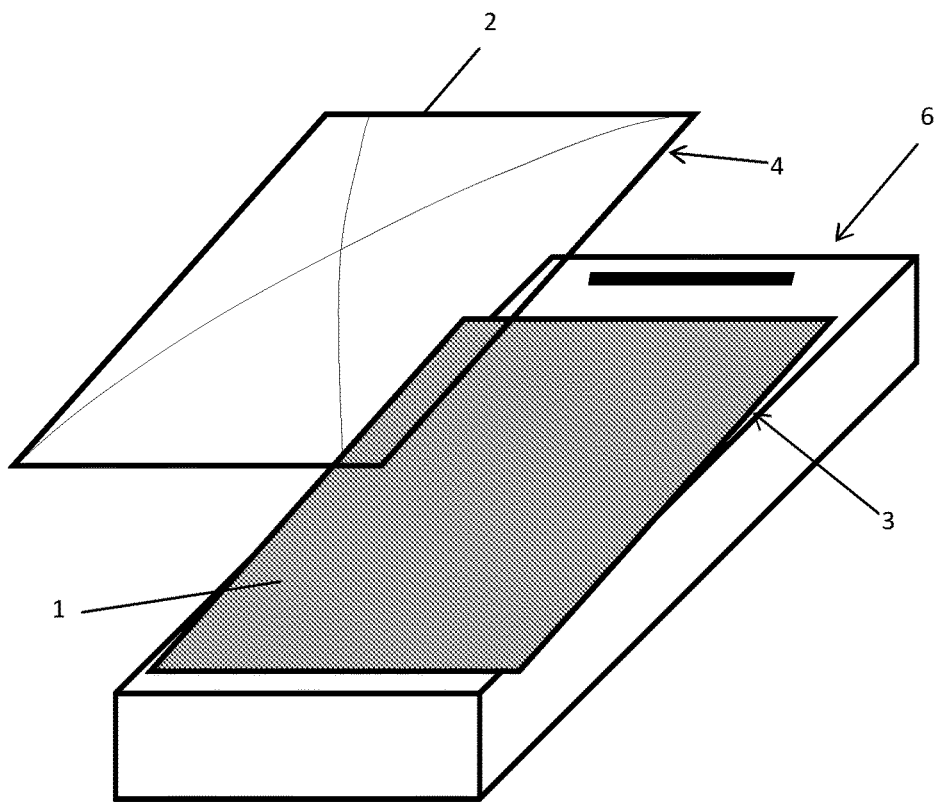
FIG. 4 shows a perspective view of a smartphone including a system according to the present invention.

As illustrated in FIG. 4, a smartphone 6 includes a touch screen. This touch screen is composed of a first layer 1 of unbreakable transparent plastic polymer material, here a polycarbonate, the first layer 1 being arranged on the smartphone 6 so that a first face is arranged on the information side and a second face on the user side. A transparent protective film constituting a lens is a layer 2 of transparent sapphire glass material, having an anti-scratch surface. This lens includes a convex outer surface and an inner surface carrying a transparent repositionable glue film 4 by which the lens, having a value of about two diopters, can be removably glued to the outer surface of the screen. This lens is ready to be superimposed on the first layer 1 thanks to the transparent repositionable glue film 4 arranged on the inner face of the transparent sapphire glass lens.

In this example, the repositionable glue is compatible with the support on which it is coated on the one hand, herein a sapphire glass, and the support on which it is glued in a repositionable manner, herein a polycarbonate.

According to FIG. 4, a notch 3 in the casing of the smartphone 6 constitutes an outer peripheral protuberance of the polycarbonate layer 1 for an easier positioning of the layer 2 forming the lens.

In this example, the first layer of material 1 and the second layer of material 2 have an antireflection treatment to optical radiation in the visible wavelength range. The second layer 2 of material is a substantially monocrystalline aluminum oxide, more specifically a synthetic sapphire having an anti-scratch surface on a first face, a second opposite face including a repositionable glue film 4.

According to the present invention, the creation of a sandwich including a polycarbonate layer, a synthetic sapphire layer in the form of a lens with a repositionable invisible binder, allows the sealing of the apparatus to never be impacted in case of breakage of the sapphire glass layer. Thus, the broken sapphire glass layer can be removed, the apparatus remaining functional and sealed until a new layer of repositionable sapphire glass is placed. Thus, a scratch-resistant surface state is obtained, and in case of shock on the crystal, the polycarbonate layer does not break and therefore protects the inside of the apparatus against dust and moisture while waiting for replacement. The sapphire glass lens can be adapted to the eyesight of a user. The user can choose, himself, the lens having a diopter adapted to his vision.

Finally, an apparatus including a crystal or a screen according to the invention can accompany a user throughout his life by adapting to the evolution of his eyesight by means of the interchangeable lens, while preserving the eyesight of the user on the one hand and the sealing of the apparatus on the other hand.

What is claimed is:

1. A system comprising a watch glass or screen for an apparatus used for displaying an information visible to a user, wherein the watch glass or the screen comprises:
   a second layer, in the form of a transparent protective film, comprising a second outer surface and a second inner surface opposite the second outer surface, wherein the second outer surface defines a convex shape;
   a first layer, formed of transparent polycarbonate, comprising a first inner surface and a first outer surface opposite the first inner surface; and
   a positioning structure defining a second rim structure, wherein:
   the positioning structure defines a convex outer surface and a concave inner groove:
   the second layer defines a convex peripheral edge;
   the shape of the concave inner groove corresponds to the shape of the convex peripheral edge;
   the convex peripheral edge is received by the concave inner groove;
   the convex outer surface of the positioning structure aligns with the convex shape of the second outer surface of the second layer; and
   the positioning structure protrudes from the first outer surface of the first layer wherein,
   the second layer is removably affixed to the first layer, with the second inner surface interfacing with the first outer surface;
   the first layer is rigidly affixed to a sealing projection, wherein the sealing projection defines a first rim structure extending towards the first layer, with the rim structure interfacing with an outer periphery of the first inner surface, to define a gap between the rest of the first inner surface and an information screen of the apparatus; and
   the second layer is operably replaceable, while the first layer is still affixed to the sealing projection.

2. The system according to claim 1, wherein the second inner surface of the second layer is removably affixed to the first outer surface of the first layer via a repositionable glue film wherein the first layer, the repositionable glue film and the second layer stacked together have a combined thickness ranging between 0.8 mm and 5 mm.

3. The system according to claim 1, wherein the first layer and/or the second layer have an antireflection treatment to optical radiation in a visible wavelength range.

4. The system according to claim 1, wherein the second layer is a converging lens including a vergence ranging between 0.25 and 4 diopters.

5. A wristwatch comprising the system according to claim 1.

6. A smartphone comprising the system according to claim 1.

7. A tablet, interactive terminal, game console, bancomat or a touch table comprising the system according to claim 1.

8. The system according to claim 1, wherein the first layer (1) has a thickness ranging between 0.8 mm and 1.2 mm.

9. The system according to claim 1, wherein the second layer is made of sapphire glass, and has a maximum thickness ranging between 0.4 mm and 1.2 mm in an area surrounding the convex shape defined by the second outer surface of the second layer.

10. "The system according to claim 1, wherein the second layer is made of sapphire glass and has a maximum thickness ranging between 0.5 mm and 0.6 mm in an area surrounding the convex shape defined by the second outer surface of the second layer.

11. The system according to claim 1, wherein the second inner surface of the second layer is removably affixed to the first outer surface of the first layer via a repositionable glue film wherein the first layer, the repositionable glue film and the second layer stacked together have a combined thickness ranging between 0.8 mm and 2 mm.

12. The system according to claim 1, wherein the second layer is a converging lens including a vergence ranging between 0.25 and 2 diopters.

* * * * *